United States Patent
Gailloux et al.

(10) Patent No.: US 10,515,392 B1
(45) Date of Patent: Dec. 24, 2019

(54) SYSTEM AND METHOD FOR GEOGRAPHIC, TEMPORAL, AND LOCATION-BASED DETECTION AND ANALYSIS OF MOBILE COMMUNICATION DEVICES IN A COMMUNICATION NETWORK

(71) Applicant: Sprint Communications Company L.P., Overland Park, KS (US)

(72) Inventors: Michael A. Gailloux, Overland Park, KS (US); Samuel Golomeke, Overland Park, KS (US); Lauren King, Somerset, NJ (US); Adam Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 397 days.

(21) Appl. No.: 15/591,093

(22) Filed: May 9, 2017

(51) Int. Cl.
  *G06Q 30/02* (2012.01)
  *H04W 4/029* (2018.01)
  (Continued)

(52) U.S. Cl.
  CPC ......... *G06Q 30/0267* (2013.01); *G06F 16/29* (2019.01); *G06Q 30/0243* (2013.01);
  (Continued)

(58) Field of Classification Search
  CPC ....................................... G06Q 30/0207–0277
  See application file for complete search history.

(56) References Cited

U.S. PATENT DOCUMENTS

| 8,478,280 B1 * | 7/2013 | Ji ..................... H04W 24/00 455/446 |
| 8,509,814 B1 * | 8/2013 | Parker ............... H04M 3/42348 455/414.2 |

(Continued)

FOREIGN PATENT DOCUMENTS

| WO | WO 2016/196496 | * 12/2016 | ............. G06Q 50/16 |

OTHER PUBLICATIONS

Latticing and Device-Histories: Dynamic Customer Profiling for Mobile Advertising Campaigns; Kridel et al., 2016 49th Hawaii International Conference on System Sciences, IEEE Computer Society.*

(Continued)

*Primary Examiner* — David J Stoltenberg

(57) ABSTRACT

A system for geographic, temporal, and location-based detection and analysis of mobile communication devices in a communication network is disclosed. The system comprises a database and a server communicatively coupled to the database that receives location data from a vendor server, sets a boundary around each location included in the location data, receives messages from mobile communication devices responsive to display of content on the mobile communication devices, analyzes mobile communication device data corresponding to determined mobile communication identifiers from cell sites, and applies a plurality of exclusions to the mobile communication devices based on the analysis to exclude mobile communication devices based on dwell times within the boundary, historical device patterns within the boundary, and/or dwell times patterns in relation to one or more geographic features in the boundary. The server then generates and displays a list of non-excluded mobile communication devices based on the plurality of exclusions applied.

20 Claims, 9 Drawing Sheets

(51) Int. Cl.
*G06F 16/29* (2019.01)
*H04L 29/12* (2006.01)
*H04W 64/00* (2009.01)

(52) U.S. Cl.
CPC ..... *G06Q 30/0246* (2013.01); *G06Q 30/0255* (2013.01); *G06Q 30/0261* (2013.01); *H04W 4/029* (2018.02); *H04L 61/6054* (2013.01); *H04W 64/003* (2013.01)

(56) References Cited

U.S. PATENT DOCUMENTS

| | | | |
|---|---|---|---|
| 9,674,660 B1* | 6/2017 | Vaynblat | G06Q 30/0261 |
| 9,772,193 B1* | 9/2017 | Mendelson | H04W 4/90 |
| 10,187,745 B1* | 1/2019 | Zhao | H04W 4/021 |
| 10,292,037 B1* | 5/2019 | Gailloux | H04W 8/04 |
| 2002/0193121 A1* | 12/2002 | Nowak | H04W 4/90 |
| | | | 455/456.1 |
| 2006/0126556 A1* | 6/2006 | Jiang | H04L 12/18 |
| | | | 370/328 |
| 2006/0270401 A1* | 11/2006 | Frangione | H04W 24/00 |
| | | | 455/423 |
| 2007/0262860 A1* | 11/2007 | Salinas | G06Q 30/02 |
| | | | 340/539.12 |
| 2008/0171559 A1* | 7/2008 | Frank | G06O 30/02 |
| | | | 455/456.5 |
| 2010/0004997 A1* | 1/2010 | Mehta | G06Q 30/02 |
| | | | 705/14.66 |
| 2010/0317371 A1* | 12/2010 | Westerinen | H04W 4/029 |
| | | | 455/456.6 |
| 2011/0199992 A1* | 8/2011 | Barker | H01Q 1/246 |
| | | | 370/329 |
| 2011/0243553 A1* | 10/2011 | Russell | G06Q 30/0631 |
| | | | 398/25 |
| 2012/0041856 A1* | 2/2012 | Narkar | G06Q 30/04 |
| | | | 705/34 |
| 2013/0040603 A1* | 2/2013 | Stahlberg | H04L 63/126 |
| | | | 455/410 |
| 2013/0045760 A1* | 2/2013 | Obermeyer | G08B 21/0277 |
| | | | 455/456.6 |
| 2013/0210461 A1* | 8/2013 | Moldavsky | G06Q 30/0261 |
| | | | 455/456.3 |
| 2013/0217332 A1* | 8/2013 | Altman | H04H 60/90 |
| | | | 455/41.2 |
| 2013/0225196 A1* | 8/2013 | James | H04W 4/029 |
| | | | 455/456.1 |
| 2013/0267253 A1* | 10/2013 | Case | H04W 4/021 |
| | | | 455/456.3 |
| 2013/0282438 A1* | 10/2013 | Hunter | G01S 1/02 |
| | | | 705/7.32 |
| 2013/0297422 A1* | 11/2013 | Hunter | G06Q 30/0261 |
| | | | 705/14.58 |
| 2013/0304878 A1* | 11/2013 | Russell | G06Q 30/0631 |
| | | | 709/220 |
| 2014/0155177 A1* | 6/2014 | Crossley | G06F 16/00 |
| | | | 463/43 |
| 2014/0214542 A1* | 7/2014 | Cohen | H04W 4/14 |
| | | | 705/14.55 |
| 2014/0337123 A1* | 11/2014 | Nuernberg | G06Q 30/0246 |
| | | | 705/14.45 |
| 2015/0018024 A1* | 1/2015 | Cohen | G06Q 30/02 |
| | | | 455/466 |
| 2015/0031388 A1* | 1/2015 | Chatterjee | H04W 4/021 |
| | | | 455/456.1 |
| 2015/0087263 A1* | 3/2015 | Branscomb | H04W 4/021 |
| | | | 455/410 |
| 2015/0148078 A1* | 5/2015 | Phillips | G08B 21/0236 |
| | | | 455/456.3 |
| 2015/0163632 A1* | 6/2015 | Phillips | G08B 21/0236 |
| | | | 455/456.3 |
| 2015/0176998 A1* | 6/2015 | Huang | H04W 4/021 |
| | | | 701/400 |
| 2015/0254704 A1* | 9/2015 | Kothe | G06Q 30/06 |
| | | | 705/14.26 |
| 2015/0281889 A1* | 10/2015 | Menendez | H04W 4/021 |
| | | | 455/456.1 |
| 2016/0100292 A1* | 4/2016 | Frank | G06Q 30/02 |
| | | | 455/410 |
| 2016/0165570 A1* | 6/2016 | Kim | H04W 4/023 |
| | | | 455/456.2 |
| 2016/0191715 A1* | 6/2016 | Mohammed | H04L 63/0428 |
| | | | 455/406 |
| 2016/0196577 A1* | 7/2016 | Reese | H04W 4/029 |
| | | | 705/14.5 |
| 2016/0247175 A1* | 8/2016 | Milton | H04W 4/029 |
| 2016/0255205 A1* | 9/2016 | Russell | G06Q 30/0631 |
| | | | 455/406 |
| 2016/0323731 A1* | 11/2016 | Mohammed | H04M 15/70 |
| 2016/0360360 A1* | 12/2016 | Jones | H04W 4/021 |
| 2017/0064667 A1* | 3/2017 | Mycek | H04B 17/318 |
| 2017/0070847 A1* | 3/2017 | Altman | H04H 60/90 |
| 2017/0116651 A1* | 4/2017 | Greenberger | G06Q 30/0281 |
| 2017/0180930 A1* | 6/2017 | Mycek | H04B 17/318 |
| 2017/0180932 A1* | 6/2017 | Zises | H04W 4/021 |
| 2017/0188199 A1* | 6/2017 | Ashley, Jr. | G06Q 10/063 |
| 2017/0206559 A1* | 7/2017 | Bakshi | G06Q 30/0261 |
| 2017/0230791 A1* | 8/2017 | Jones | H04L 61/609 |
| 2017/0280271 A1* | 9/2017 | Lyman | H04W 4/021 |
| 2017/0332343 A1* | 11/2017 | Vaccari | H04L 67/104 |
| 2017/0352042 A1* | 12/2017 | Tineo | G06Q 30/0201 |
| 2018/0007214 A9* | 1/2018 | Russell | G06Q 30/0631 |
| 2018/0040011 A1* | 2/2018 | Milton | G06Q 30/02 |
| 2018/0060911 A1* | 3/2018 | DeLuca | G06Q 30/0269 |
| 2018/0109913 A1* | 4/2018 | Walden | G06T 7/70 |
| 2018/0109928 A1* | 4/2018 | Walden | G06T 7/70 |
| 2018/0124564 A1* | 5/2018 | Phillips | G08B 21/0236 |
| 2018/0130078 A1* | 5/2018 | Jones | G06Q 10/087 |
| 2018/0278462 A1* | 9/2018 | Bjontegard | H04L 41/044 |
| 2018/0349954 A1* | 12/2018 | Mehta | G06Q 30/0261 |
| 2019/0019211 A1* | 1/2019 | Akselrod | G06Q 30/0242 |

OTHER PUBLICATIONS

Location Analytics as a Service: Providing Insights for Heterogeneous Spatiotemporal Data; Deva et al., 2015 IEEE International Conference on Web Services, IEEE Computer Society.*

Advances in Crowd Analysis for Urban Applications Through Urban Event Detection; Kaiser et al., IEEE Transactions on Intelligent Transportation Systems, vol. 19, No. 10, Oct. 2018.*

Inferring Human Activity in Mobile Devices by Computing Multiple Contexts; Chen et al., Sensors 2015, 15, 21219-21238; doi: 10.3390/s150921219.*

Systems and Methods of Managing Geofences; Besik et al., Apr. 22, 2016, Technical Disclosure Commons.*

* cited by examiner

SYSTEM AND METHOD FOR GEOGRAPHIC, TEMPORAL, AND LOCATION-BASED DETECTION AND ANALYSIS OF MOBILE COMMUNICATION DEVICES IN A COMMUNICATION NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be capable of receiving and displaying content. In some instances, one of the goals of such content may be to encourage users of the mobile communications devices to visit one or more locations associated with the content.

SUMMARY

In an embodiment, a system for geographic, temporal, and location-based detection and analysis of mobile communication devices in a communication network is disclosed. The system comprises a database comprising cell site data that indicates a coverage area of each of a plurality of cell sites in a wireless network, mobile communication device data from the plurality of cell sites, and a look-up table associating identifiers with mobile communication device identifiers. The system additionally comprises a server communicatively coupled to the database and comprising a non-transitory memory, a processor, and one or more applications stored in the non-transitory memory, that when executed by the processor, receive location data from a vendor server associated with a vendor, wherein the location data comprises locations of a plurality of stores of the vendor. The one or more applications also determine which cell sites of the plurality of cell sites have coverage areas that include the locations of the plurality of stores based on the received location data and the cell site data from the database, set a boundary around each of the locations of the plurality of stores, determine which one or more cell sectors associated with the determined cell sites are at least partially within each boundary based on the cell site data from the database, and receive a plurality of messages comprising a plurality of identifiers from a plurality of mobile communication devices in response to display of content on the plurality of mobile communication devices. The content is associated with the vendor and a time period. The one or more applications additionally determine a plurality of mobile communication device identifiers corresponding to the plurality of identifiers using the look-up table in the database, analyze the mobile communication device data corresponding to the plurality of mobile communication identifiers from the database, determine which cell sectors each of the plurality of mobile communications devices resided within during the time period and dwell times for each mobile communication device within each of the cell sectors based on the analysis. The one or more applications further exclude any mobile communication devices of the plurality of mobile communication devices within the boundary during the time period with dwell times less than a minimum dwell time threshold, exclude any mobile communication devices of the plurality of mobile communication devices within the boundary during the time period with dwell times greater than a maximum dwell time threshold, generate a list of a subset of the plurality of mobile communication devices based on the exclusions, and display the list on a display. The subset of the plurality of mobile communication devices consists of non-excluded mobile communication devices.

In another embodiment, a method for geographic, temporal, and location-based detection and analysis of mobile communication devices in a communication network is disclosed. The method comprises receiving, by one or more applications stored in a non-transitory memory of a server and executable by a processor of the server, location data from a vendor server associated with a vendor. The location data comprises locations of a plurality of stores of the vendor. The method also comprises determining, by the one or more applications, which cell sites of a plurality of cell sites have coverage areas that include the locations of the plurality of stores based on the received location data and cell site data from a database. The cell site data indicates a coverage area of each of the plurality of cell sites in a wireless network. The method further comprises setting, by the one or more applications, a boundary around each of the locations of the plurality of stores, determining, by the one or more applications, which one or more cell sectors associated with the determined cell sites are at least partially within each boundary based on the cell site data from the database, and receiving, by the one or more applications, a plurality of messages comprising a plurality of identifiers from a plurality of mobile communication devices in response to display of content on the plurality of mobile communication devices. The content is associated with the vendor and a time period. The method also comprises determining, by the one or more applications, a plurality of mobile communication device identifiers corresponding to the plurality of identifiers using a look-up table in the database. The look-up table associates identifiers with mobile communication device identifiers. The method additionally comprises analyzing, by the one or more applications, mobile communication device data corresponding to the plurality of mobile communication identifiers from the plurality of cell sites and stored in the database, determining, by the one or more applications, a historical device pattern for each of the plurality of mobile communications devices by determining which cell sectors each of the plurality of mobile communications devices historically resided within before the time period and historical dwell times for each mobile communication device within each of the cell sectors before the time period based on the analysis, and excluding, by the one or more applications, any mobile communication devices of the plurality of mobile communication devices that have historical device patterns within the boundary. The method also comprises determining, by the one or more applications, one or more geographic features within the boundary based on geographic feature data in the database, determining, by the one or more applications, a historical device pattern in relation to the one or more geographic features based on the mobile communication device data by determining typical dwell times at the one or more geographic features and at what times of day, and excluding, by the one or more applications, any mobile communication devices of the plurality of mobile communication devices within the boundary during the time period with dwell times at times of day consistent with the historical device pattern in relation to the one or more geographic features. The method further comprises generating, by the one or more applications, a list of a subset of the plurality of mobile communication devices based on the exclusions and displaying, by the one or more applications, the list on a display. The subset of the plurality of mobile communication devices consists of non-excluded mobile communication devices.

In yet another embodiment, a method for geographic, temporal, and location-based detection and analysis of mobile communication devices in a communication network is disclosed. The method comprises receiving, by one or more applications stored in a non-transitory memory of a server and executable by a processor of the server, location data from a vendor server associated with a vendor. The location data comprises locations of a plurality of stores of the vendor. The method also comprises determining, by the one or more applications, which cell sites of a plurality of cell sites have coverage areas that include the locations of the plurality of stores based on the received location data and cell site data from a database. The cell site data indicates a coverage area of each of the plurality of cell sites in a wireless network. The method additionally comprises setting, by the one or more applications, a boundary around each of the locations of the plurality of stores, determining, by the one or more applications, which one or more cell sectors associated with the determined cell sites are at least partially within each boundary based on the cell site data from the database, and receiving, by the one or more applications, a plurality of messages comprising a plurality of identifiers from a plurality of mobile communication devices in response to display of content on the plurality of mobile communication devices. The content is associated with the vendor and a time period. The method further comprises determining, by the one or more applications, a plurality of mobile communication device identifiers corresponding to the plurality of identifiers using a look-up table in the database. The look-up table associates identifiers with mobile communication device identifiers. The method also comprises analyzing, by the one or more applications, mobile communication device data corresponding to the plurality of mobile communication identifiers from the plurality of cell sites and stored in the database, applying, by the one or more applications, a plurality of exclusions to the plurality of mobile communication devices based on the analysis, and generating, by the one or more applications, a list of a subset of the plurality of mobile communication devices based on the plurality of exclusions. The subset of the plurality of mobile communication devices consists of non-excluded mobile communication devices. The method additionally comprises selecting, by the one or more applications, a plurality of control group mobile communication devices that did not receive the content, determining, by the one or more applications, a plurality of control group mobile communication device identifiers corresponding to the plurality of control group mobile communication devices, and analyzing, by the one or more applications, mobile communication device data corresponding to the plurality of control group mobile communication identifiers from the plurality of cell sites and stored in the database. The method also comprises applying, by the one or more applications, the plurality of exclusions to the plurality of control group mobile communication devices based on the analysis and generating, by the one or more applications, a list of a subset of the plurality of control group mobile communication devices based on the plurality of exclusions. The subset of the plurality of control group mobile communication devices consists of non-excluded control group mobile communication devices. The method further comprises removing, by the one or more applications, one or more of the non-excluded mobile communication devices from the list of the subset of the plurality of mobile communication devices based on the number of non-excluded control group mobile communication devices in the subset of the plurality of control group mobile communication devices.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
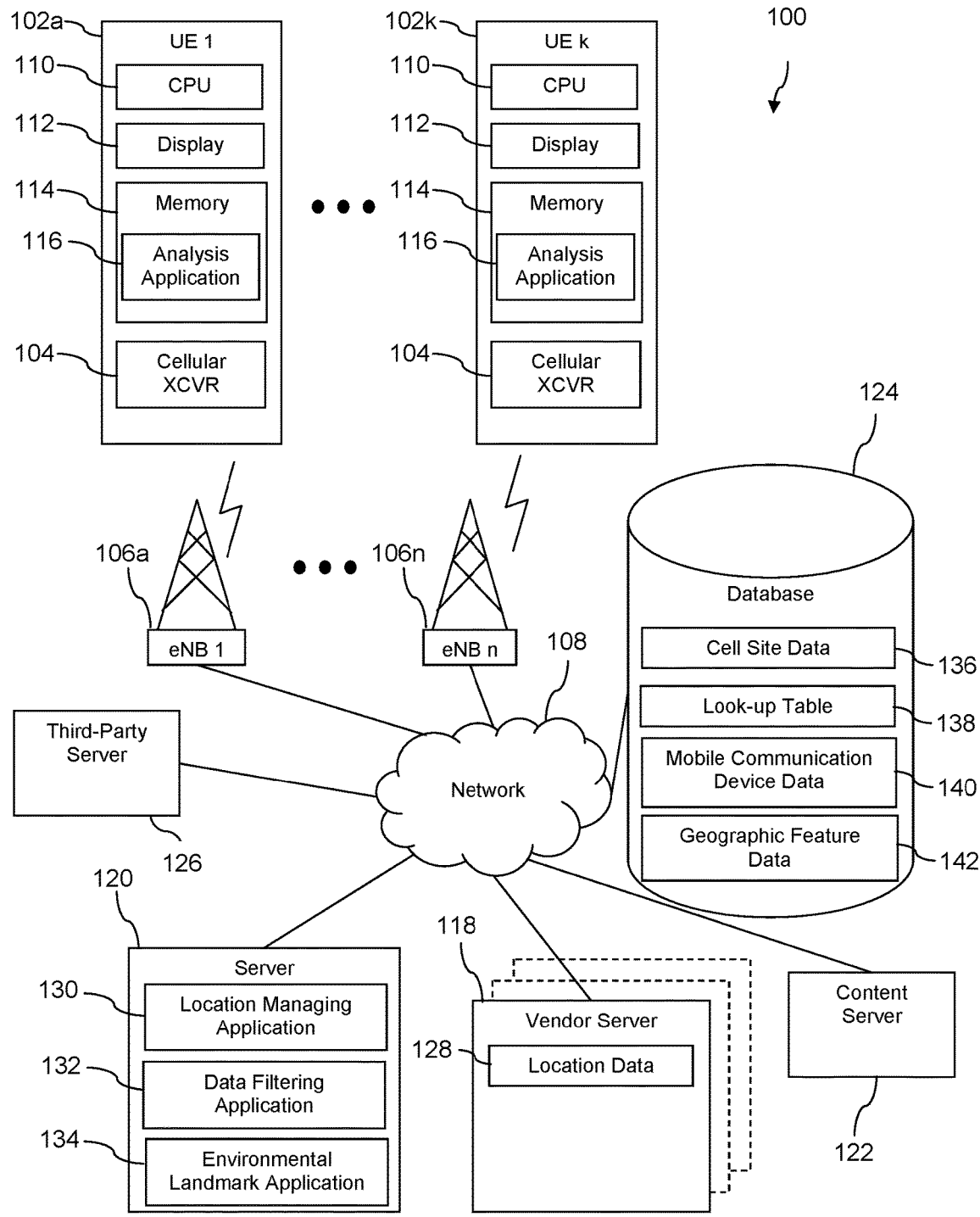
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The wide spread use of mobile communication devices makes them ideal for displaying content, such as digital advertisements. Mobile advertisers want to know how much foot traffic and/or sales results from mobile advertisements. However, it is a complicated, multi-faceted technical challenge to provide a reasonably accurate assessment of mobile advertisement effectivity. This disclosure enables such an assessment by providing a computer-implemented, technical solution, which includes a system and method for geographic, temporal, and location-based detection and analysis of mobile communication devices in a communication network using data from multiple disparate sources (e.g., the mobile communication devices, cell stations, a vendor server, a third-party server, etc.).

The computer-implemented, technical solution includes a determination of which mobile communication devices actually presented a given mobile advertisement on-screen. To make this determination, each of the mobile communication devices may comprise an analysis application that performs pixel analysis to determine if and when the mobile advertisement has been presented on a display of the corresponding mobile communication device. Alternatively, a different method of validating that content distributed to the mobile communication device was presented may be used. In response to a determination that the mobile advertisement has been displayed, the analysis application of a mobile communication device may transmit a message comprising an identifier associated with the mobile communication device to a server.

The server may receive a plurality of messages from a plurality of mobile communication devices (e.g., from the analysis application on each of the mobile communication devices) that presented the mobile advertisement, determine a plurality of mobile communication device identifiers corresponding to the plurality of identifiers from the plurality of messages using a look-up table, and analyze mobile communication device data corresponding to the plurality of mobile communication identifiers from a plurality of cell sites. Based on the analysis, the population of the plurality of mobile communication devices that have presented the mobile advertisement may be filtered by the server to eliminate mobile communication devices, which for geographic, temporal, and/or location reasons, are not amenable to attribution.

For example, based on the analysis, the server may exclude any mobile communication devices within a boundary of one or more stores associated with the mobile advertisement during a time period associated with the mobile advertisement with dwell times longer than a maximum dwell time threshold (e.g., a user lives or works near the store (i.e., within the boundary)) or with dwell times shorter than a minimum dwell time threshold (e.g., a user drives past the store during morning and evening work commute). In another example, based on the analysis, the server may exclude any mobile communication devices that have historical device patterns within the boundary of the one or more stores (e.g., a user has soccer practice within the boundary twice a week). In a further example, the server may further analyze dwell time patterning in relation to geographic features in the boundary and may exclude any mobile communication devices within the boundary during the time period with dwell times at times of day consistent with a historical device pattern in relation to one or more geographic features in the boundary (e.g., there is a park by the store within the boundary where mobile communication devices historically dwell for one hour between 10 am and 12 pm and 3 pm and 5 pm, and a user was within the boundary around 11 am with a dwell time of about one hour).

The server may generate and display a list of any remaining, non-excluded mobile communication devices. The remaining, non-excluded mobile communication devices may be deemed a purchase and/or foot traffic event for the one or more stores, and the server may determine an attribution or success rate for the mobile advertisement based on such events. In some embodiments, a third-party server (e.g., associated with a credit card institution or the retail enterprise itself) may be accessed to confirm the imputed purchase event. In some instances, the third-party server may charge per access. By applying the plurality of exclusions and eliminating unlikely mobile communication devices, processing resources of the third-party server are conserved as well as monetary resources of the vendor.

In some embodiments, the server may select a control group of mobile communication devices who did not receive the mobile advertisement. This control group may be selected based on the same profile used to send the mobile advertisement to the mobile communication devices (e.g., a married male, college educated, income $60,000 to $120,000, age 35-50, etc.). A substantially similar analysis that may consider dwell times of the control group within the boundary, historical device patterns of the control group, and/or dwell times of the control group within the boundary in relation to the one or more geographic features and may apply the same exclusions is performed for the control group of mobile communication devices. The server may generate and display a list of any remaining, non-excluded control group mobile communication devices. This background incidence rate determined based on the control group may be subtracted from the attribution or success rate discussed above and the result may be attributed as the rate at which the mobile advertisement drives sales and/or foot traffic. The determined attribution or success rate may be used to justify higher rates for advertisements, improve advertising campaigns, and/or persuade a potential advertising client to use the advertising platform.

Turning now to FIG. 1, a system 100 is described. In an embodiment, the system 100 comprises a plurality of user equipment (UE) 102a-102k that each has a cellular radio transceiver 104, which may be able to establish a wireless communication link to one or more of a plurality of cell sites 106a-106n that communicatively links the plurality of UE 102a-102k to a network 108. In some contexts herein, the plurality of UE 102a-102k and the plurality of cell sites 106a-106n may be referred to as the UEs 102 and the cell sites 106, respectively. Each of the UEs 102 may further comprise a processor 110, a display 112, and a memory 114. The memory 114 may store an analysis application 116. The analysis application 116 may be stored in a non-transitory region of the memory 114.

Each of the UEs 102 may be referred to as a mobile communication device. Each of the UEs 102 may be a mobile phone, a smart phone, a personal digital assistant (PDA), a media player, a wearable computer, a headset computer, a laptop computer, a notebook computer, or a tablet computer. Each of the cell sites 106 may be an enhanced Node B (eNB), a base transceiver station (BTS), a picocell, or other cellular radio access network (RAN) access point. The cell sites 106 may provide cellular wireless communication links to one or more of the UEs 102 according to at least one of a long-term evolution (LTE), a code division multiple access (CDMA), a global system for mobile communications (GSM), or a worldwide interoperability for microwave access (WiMAX) cellular telecommunication protocol. The system 100 may comprise any number of UEs 102 and any number of cell sites 106.

The system 100 may further comprise a vendor server 118, a server 120, a content server 122, a database 124, and a third-party server 126. The vendor server 118, the server 120, the content server 122, and the third party-server 126 may be implemented as computer systems. Computer systems are described further hereinafter. The server 120 may be communicatively coupled via the network 108 to each of the vendor server 118, the content server 122, the database 124, and the third party server 126. The network 108 comprises one or more private networks, one or more public networks, or a combination thereof. The network 108 promotes communication as desired among the several components 118, 120, 122, 124, and/or 126.

The vendor server 118 may be associated with a vendor. For example, the vendor server 118 may be associated with a vendor of goods and/or services. In an embodiment, the vendor server 118 comprises location data 128. The location data 128 may comprise locations of a plurality of stores of the vendor. For instance, if the vendor is a food vendor, the location data 128 may comprise locations of a plurality of restaurants of the food vendor. In another example, if the vendor is a clothing vendor, the location data 128 may comprise locations of a plurality of retail stores of the clothing vendor. In a further example, if the vendor is a gasoline vendor, the location data may comprise locations of a plurality of gas stations of the gasoline vendor. In yet another example, if the vendor is a car dealer, the location data may comprise locations of a plurality of car dealerships of the car dealer. These vendor examples are merely illustrative and the vendor may comprise any type of vendor without departing from the spirt or scope of the present disclosure. In an embodiment, the vendor server 118 sends the location data 128 to the server 120. As illustrated by the dashed boxes behind the vendor server 118 in FIG. 1, there may be a plurality of vendor servers associated with a plurality of different vendors without departing from the spirit or scope of the present disclosure.

The server 120 may comprise one or more applications. In an embodiment, the server 120 comprises a location managing application 130, an environmental landmark application 134, and a data filtering application 132. The location managing application 130 may receive the location data 128 from the vendor server 118 and determine which cell sites of the plurality of cell sites 106a-106n have coverage areas that include the locations of the stores based on the received location data 128 and based on cell site data 136 from the database 124. In an embodiment, the cell site data 136 indicates a coverage area of each of the cell sites 106.

The location managing application 130 may set a boundary around each of the locations of the plurality of stores. In an embodiment, the boundary is set at about 500 meters around each of the plurality of stores. For example, the boundary for each of the plurality of stores may be set at between 450 and 550 meters. In some embodiments, the boundary is set at one mile or less. The boundary may be in a circular shape, a square shape, a rectangular shape, a triangular shape, a pentagonal shape, a hexagonal shape, or some other shape. The boundary distance and shape around each of the plurality of stores may be the same or different.

The location managing application 130 may determine which one or more cell sectors associated with the determined cell sites are at least partially within each boundary based on the cell site data 136 from the database 124. As understood by those skilled in the art, a cell site may have a plurality of directional antennas that provide wireless communication access coverage to a plurality of different sectors associated with the different antennas. For example, a first antenna group of the cell site 106a may provide wireless communication access coverage to a first cell sector, a second antenna group of the cell site 106a may provide wireless access coverage to a second cell sector, and a third antenna group of the cell site 106a may provide wireless communication access coverage to a third cell sector.

In an embodiment, the content server 122 sends each of the UEs 102 content associated with the vendor. For example, the content server 122 may send each of the UEs an advertisement associated with the vendor. In some embodiments, the content sent by the content server 122 to each of the UEs 102 may be a part of an advertising campaign. The content may be associated with a time period. The time period may be set by the vendor and may indicate a time window for an offer associated with the content. For example, a food vendor may set a five day or less time period while a gasoline vendor may set a longer time period.

The location managing application 130 may receive a plurality of messages comprising a plurality of identifiers from the UEs 102 in response to display of the content on the UEs 102. In particular, the analysis application 116 on each of the UEs 102 may determine (e.g., via pixel analysis) that the content is displayed on the corresponding UE and in response to such a determination, transmit a message comprising an identifier associated with the corresponding UE to the server 120. In an embodiment, the identifier comprises an advertising ID. For example, the identifier may comprise a Google advertising ID, an Apple advertising ID, or another advertising ID.

After receiving the plurality of identifiers, the location managing application 130 may determine a plurality of mobile communication device identifiers corresponding to the plurality of identifiers using a look-up table 138 in the database 124. The look-up table 138 may associate identifiers (e.g., advertising IDs) with mobile communication device identifiers. In an embodiment, the mobile communication device identifiers comprise one or more of mobile equipment identifiers (MEIDs), international mobile subscriber identities (IMSIs), international mobile equipment identities (IMEIs), or another type of mobile communication device identifiers.

The location managing application 130 may analyze mobile communication device data 140 corresponding to the plurality of mobile communication identifiers determined using the look-up table 138. The mobile communication device data 140 may be stored in the database 124 and may comprise data from the cell sites 106. Based on the analysis, the location managing application 130 may determine which cell sectors each of the plurality of UEs 102 resided within during the time period and dwell times for each UE within each of the cell sectors. Each of the plurality of UEs 102 may be associated with a customer or a user. Thus, the location managing application 130 may infer which cell sector each user or customer resided within, lived in, and/or habituated in during the time period and dwell times for each user or customer within each of the cell sectors based on the analysis of the mobile communication device data 140. In some embodiments, a global positioning system (GPS) location of one or more of the UEs 102 may be used in addition to or in lieu of the network location determined based on the mobile communication device data 140 to determine mobile communication device locations and dwell times.

The data filtering application 132 may apply a plurality of exclusions to the UEs 102 based on the analysis performed by the location managing application 130 to ascertain an amount of foot traffic driven to the plurality of stores based on the display of content on the UEs 102. The data filtering application 132 may exclude any UEs of the UEs 102 not within the boundary around any of the plurality of stores during the time period. The data filtering application 132 may exclude any UEs of the UEs 102 within the boundary around one or more of the plurality of stores during non-operating hours of the vendor. For example, in the case of a food vendor with a plurality of restaurants, if the restaurants are only open for breakfast and lunch and closed from 3 PM to 5 AM, any UEs of the UEs 102 within the boundary around one or more of the restaurants from 3 PM to 5 AM during the time period may be excluded.

In an embodiment, the data filtering application 132 excludes any UEs of the UEs 102 within the boundary around one or more of the plurality of stores during the time period with dwell times less than a minimum dwell time threshold. This exclusion may remove any UEs of the UEs 102 that may be merely driven through the boundary. The data filtering application 132 may also exclude any UEs of the UEs 102 within the boundary around one or more of the plurality of stores during the time period with dwell times greater than a maximum dwell time threshold. This exclusion may remove any UEs of the UEs 102 that may be associated with a customer who is working in the boundary and/or lives at a residence or home within the boundary.

The minimum dwell time threshold and the maximum dwell time threshold may be determined by the vendor based on a type of good or service provided by the vendor at the plurality of stores. For example, if the vendor is a gasoline vendor, the minimum dwell time threshold may be five minutes and the maximum dwell time threshold may be ten minutes. Continuing with this example, if any of the UEs 102 has a dwell time of less than five minutes within the boundary of any of the gas stations or more than ten minutes within the boundary of any of the gas stations, those UEs may be excluded by the data filtering application 132. Thus, if a UE is in a vehicle being driven through the boundary, that UE would be excluded if the UE was within the boundary for less than five minutes. Similarly, if a UE is within the boundary longer than ten minutes (e.g., hours if the UE is associated with a customer who works or lives in the boundary), that UE would be excluded.

In some embodiments, the minimum and maximum dwell time thresholds are also set based on other vendors in the boundary. For instance, continuing with the above gasoline vendor example, if there is a grocery store close to one of the gas stations within the boundary, the maximum dwell time threshold may be set to ten minutes because the typical dwell time for customers in the grocery store is longer than ten minutes. Taking into account the other vendors in the boundary when setting the minimum and maximum dwell time thresholds may enable a more accurate assessment of the amount of foot traffic driven to the plurality of stores (e.g., the gas stations as opposed the grocery store) based on the display of content on the UEs 102.

The data filtering application 132 may consider historical device patterns of the UEs 102 when determining whether to exclude any of the UEs 102. In an embodiment, the location managing application 130 determines a historical device pattern for each of the UEs 102 by determining which cell sectors each of the UEs 102 historically resided within before the time period and historical dwell times for each UE within each of the cell sectors before the time period based on the analysis of mobile communication device data 140 performed by the location managing application 130. The data filtering application 132 may exclude any UEs of the UEs 102 that have historical device patterns within the boundary. For example, if a UE is associated with a customer who drives through the boundary every week day to get coffee/and or breakfast at a nearby coffee shop, that UE may be excluded based on the historical device pattern of the UE within the boundary.

The data filtering application 132 may consider dwell time patterning in relation to geographic features within the boundary when determining whether to exclude any of the UEs 102. In an embodiment, the environmental landmark application 134 determines one or more geographic features within the boundary based on geographic feature data 142 in the database 124 that indicates locations of a plurality of geographic features. The plurality of geographic features may comprise parks, schools, highways, or other geographic features. The location managing application 130 may determine a historical device pattern in relation to the one or more geographic features based on the mobile communication device data 140 by determining typical dwell times at the one or more geographic features and at what times of day. The data filtering application 132 may exclude any UEs of the UEs 102 within the boundary during the time period with dwell times at times of day consistent with the historical device pattern in relation to the one or more geographic features. For example, if a park is located within the boundary, the location managing application 130 may determine that most customers dwell for thirty minutes to one hour between 10 AM and 1 PM. Continuing with the example, if a UE is within the boundary during the time period for at least thirty minutes, but less than one hour between 10 AM and 1 PM, that UE may be excluded based on the dwell time patterning in relation to the physical landscape (e.g., the park).

In an embodiment, the data filtering application 132 generates a list of a subset of the UEs 102 based on the exclusions applied. The subset of the UEs may consist of non-excluded UEs. The activity of the non-excluded UEs within the boundary of the one or more stores during the time period may be attributed to the display of the content on the UEs 102. In an embodiment, the list is displayed on a display such as a display of the server 120.

In some embodiments, the server 120 may communicate with the third-party server 126 to validate whether a purchase was made at one or more of the plurality of stores within the time period by each of the non-excluded UEs. For example, the server 120 may send corresponding identifiers (e.g., their advertising IDs) associated with the non-excluded UEs to the third party server 126. Applying the plurality of exclusions and sending corresponding identifiers for only the non-excluded UEs as opposed to all of the UEs 102 conserves resources including processing resources of the third-party server 126 as well as monetary resources of the vendor since the third-party server 126 may charge a fee for each identifier/transaction check. The server 120 may receive a report from the third-party server 126. In an embodiment, the report indicates each transaction with the vendor during the time period associated with any of the corresponding identifiers and a purchase amount of each transaction. The server 120 may send the report to the vendor.

In some embodiments, the server 120 may select a plurality of control group UEs (not illustrated in FIG. 1) that did not receive the content. In an embodiment, the UEs 102 that display the content are selected to receive the content based on a common demographic profile and the plurality of control group UEs that did not receive the content are selected based on the common demographic profile. For example, the UEs 102 and the control group UEs may be associated with customers of the same sex and in the same age range, education level, income range, and/or other similar demographic attribute.

The one or more applications 130, 132, and 134 of the server 120 may perform an analysis for the plurality of control group UEs substantially similar to the analysis discussed above for the UEs 102 that received the content. For instance, the one or more applications of the server 120 may determine a plurality of control group mobile communication device identifiers corresponding to the plurality of control group of UEs. In an embodiment, the control group mobile communication device identifiers comprise one or more of MEIDs, IMSIs, IMEIs, or another type of mobile communication device identifiers. The location managing application 130 may analyze the mobile communication device data 140 corresponding to the plurality of control group mobile communication identifiers from the plurality of cell sites 106 and stored in the database 124. Based on the analysis, the location managing application 130 may determine which cell sectors each of the plurality of control group UEs resided within during the time period and dwell times for each UE within each of the cell sectors.

The data filtering application 132 may apply the same plurality of exclusions to the plurality of control UEs as applied to the UEs 102 based on the analysis performed by the location managing application 130 to ascertain an amount of foot traffic driven to the plurality of stores independent of any display of content. The data filtering application 132 may exclude any UEs of the plurality of control group UEs not within the boundary around any of the plurality of stores during the time period. The data filtering application 132 may exclude any UEs of the plurality of control group UEs within the boundary around one or more of the plurality of stores during non-operating hours of the vendor.

In an embodiment, the data filtering application 132 excludes any UEs of the plurality of control group UEs within the boundary around one or more of the plurality of stores during the time period with dwell times less than the minimum dwell time threshold. The data filtering application 132 may also exclude any UEs of the plurality of control group UEs within the boundary around one or more of the plurality of stores during the time period with dwell times greater than the maximum dwell time threshold.

The data filtering application 132 may consider historical device patterns of the plurality of control group UEs when determining whether to exclude any of the plurality of control group UEs. In an embodiment, the location managing application 130 determines a historical device pattern for each of the plurality of control group UEs by determining which cell sectors each of the plurality of control group UEs historically resided within before the time period and historical dwell times for each control group UE within each of the cell sectors before the time period based on the analysis of mobile communication device data 140 performed by the location managing application 130. The data filtering application 132 may exclude any UEs of the plurality of control group UEs that have historical device patterns within the boundary. The data filtering application 132 may also exclude any UEs of the plurality of UEs within the boundary during the time period with dwell times at times of day consistent with the historical device pattern in relation to the one or more geographic features in the boundary.

In an embodiment, the data filtering application 132 generates a list of a subset of the plurality of control group UEs based on the exclusions applied. The subset of the plurality of control group UEs may consist of non-excluded control group UEs. In an embodiment, the data filtering application 132 removes one or more of the non-excluded UEs from the list of the subset of the UEs 102 based on the number of non-excluded control group UEs in the subset of the plurality of control group UEs. The activity of the remaining non-excluded UEs may be attributed to the display of the content on the UEs 102. In an embodiment, the revised list is displayed on a display such as a display of the server 120.

Figure 2A:
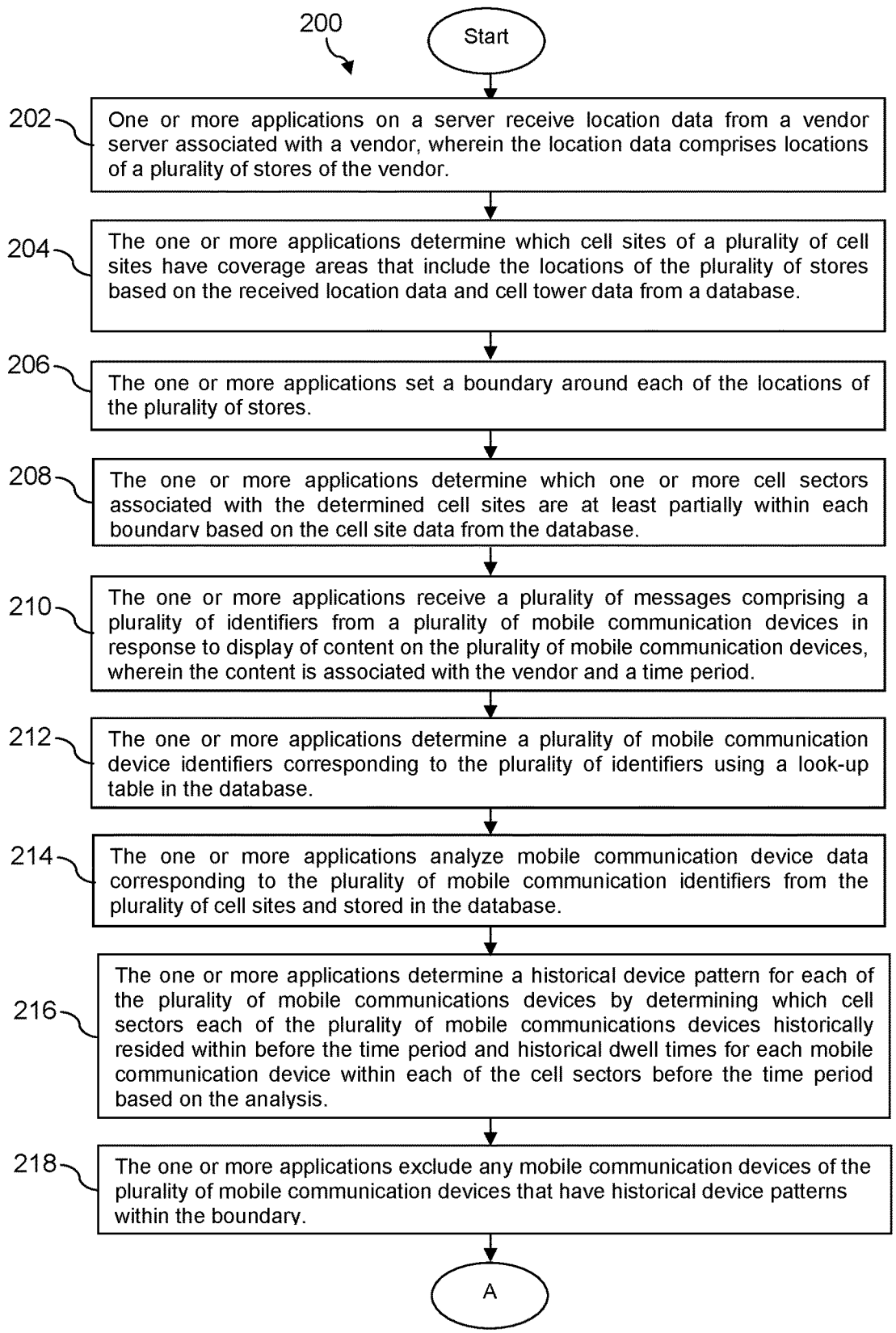
FIG. 2A and FIG. 2B are a flow chart of a method according to an embodiment of the disclosure.
Figure 2B:
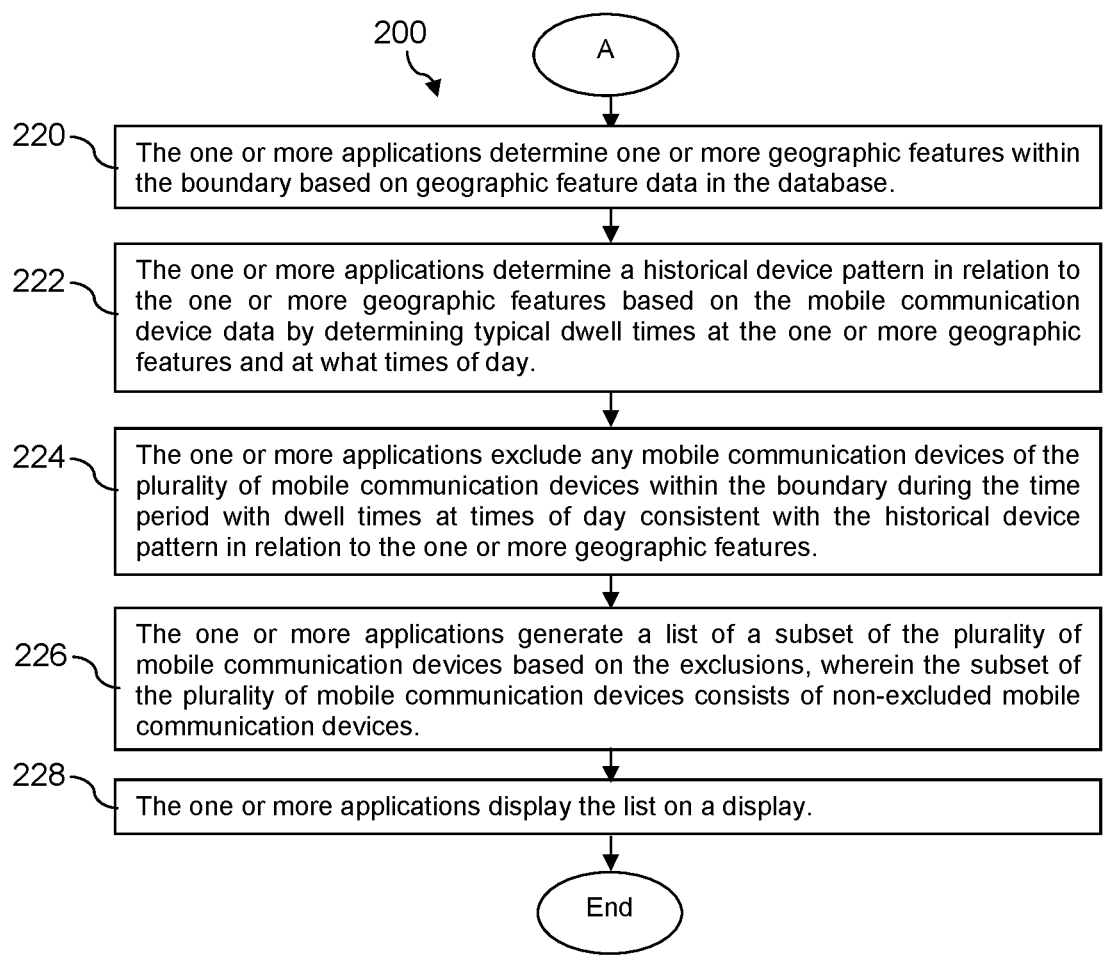

Turning now to FIG. 2A and FIG. 2B, a method 200 is described. At block 202, one or more applications (e.g., the location managing application 130, the data filtering application 132, and/or the environmental landmark application 134) on a server (e.g., server 120) receive location data 128 from a vendor server 118 associated with a vendor. The location data 128 may comprise locations of a plurality of stores of the vendor. At block 204, the one or more applications determine which cell sites of a plurality of cell sites 106 have coverage areas that include the locations of the plurality of stores based on the received location data 128 and cell site data 136 from a database 124. At block 206, the one or more applications set a boundary around each of the locations of the plurality of stores. At block 208, the one or more applications determine which one or more cell sectors associated with the determined cell sites are at least partially within each boundary based on the cell site data 136 from the database 124.

At block 210, the one or more applications receive a plurality of messages comprising a plurality of identifiers from a plurality of mobile communication devices (e.g., the UEs 102) in response to display of content on the plurality of mobile communication devices. The content may be associated with the vendor and a time period. At block 212, the one or more applications determine a plurality of mobile communication device identifiers corresponding to the plurality of identifiers using a look-up table 138 in the database 124. At block 214, the one or more applications analyze mobile communication device data 140 corresponding to the plurality of mobile communication identifiers from the plurality of cell sites 106 and stored in the database 124.

At block 216, the one or more applications determine a historical device pattern for each of the plurality of mobile communication devices by determining which cell sectors each of the plurality of mobile communication devices historically resided within before the time period and historical dwell times for each mobile communication device within each of the cell sectors before the time period based on the analysis. At block 218, the one or more applications exclude any mobile communication devices of the plurality of mobile communication devices that have historical device patterns within the boundary.

At block 220, the one or more applications determine one or more geographic features within the boundary based on geographic feature data 142 in the database 124. At block 222, the one or more applications determine a historical pattern in relation to the one or more geographic features based on the mobile communication device data 140 by determining typical dwell times at the one or more geographic features and at what times of day. At block 224, the one or more applications exclude any mobile communication devices of the plurality of mobile communication devices within the boundary during the time period with dwell times at times of day consistent with the historical device pattern in relation to the one or more geographic features.

At block 226, the one or more applications generate a list of a subset of the plurality of mobile communication devices based on the exclusions. The subset of the plurality of mobile communication devices may consist of non-excluded mobile communication devices. At block 228, the one or more applications display the list on a display.

Figure 3A:
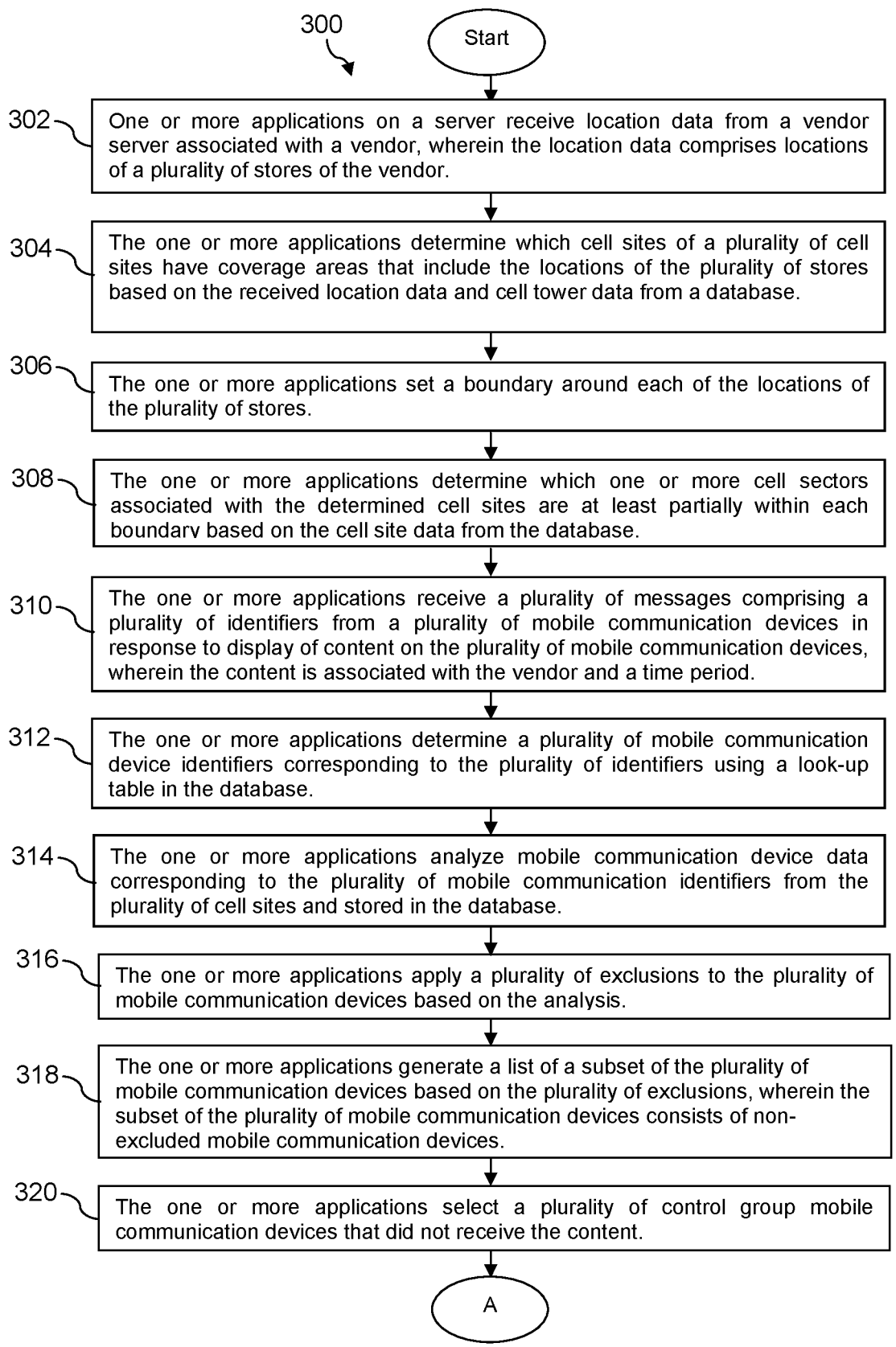
FIG. 3A and FIG. 3B are a flow chart of another method according to an embodiment of the disclosure.
Figure 3B:
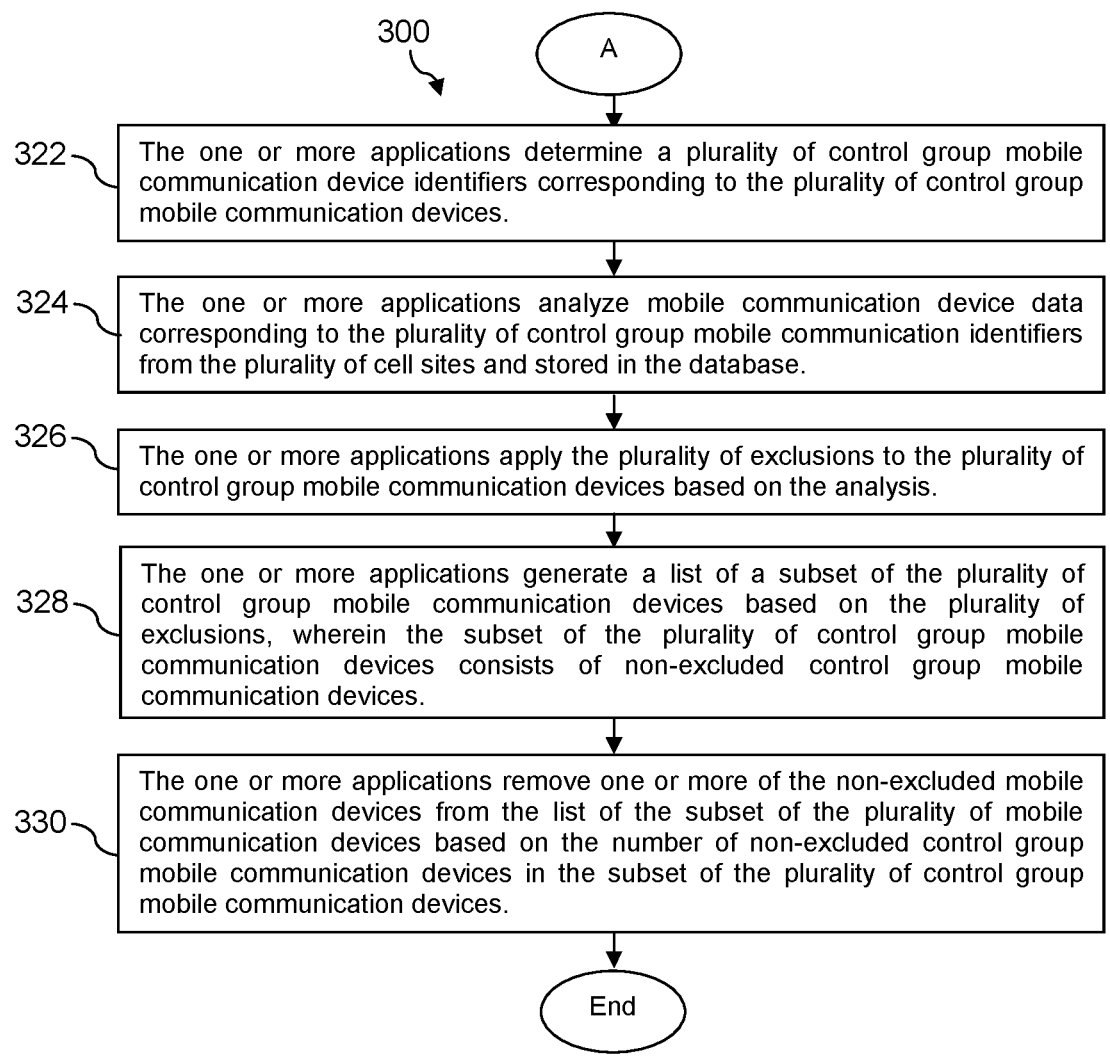

Turning now to FIG. 3A and FIG. 3B, a method 300 is described. At block 302, one or more applications (e.g., the location managing application 130, the data filtering application 132, and/or the environmental landmark application 134) on a server (e.g., server 120) receive location data 128 from a vendor server 118 associated with a vendor. The location data 128 may comprise locations of a plurality of stores of the vendor. At block 304, the one or more applications determine which cell sites of a plurality of cell sites 106 have coverage areas that include the locations of the plurality of stores based on the received location data 128 and cell site data 136 from a database 124. At block 306, the one or more applications set a boundary around each of the locations of the plurality of stores. At block 308, the one or more applications determine which one or more cell sectors associated with the determined cell sites are at least partially within each boundary based on the cell site data 136 from the database 124.

At block 310, the one or more applications receive a plurality of messages comprising a plurality of identifiers from a plurality of mobile communication devices (e.g., the UEs 102) in response to display of content on the plurality of mobile communication devices. The content may be associated with the vendor and a time period. At block 312, the one or more applications determine a plurality of mobile communication device identifiers corresponding to the plurality of identifiers using a look-up table 138 in the database 124. At block 314, the one or more applications analyze mobile communication device data 140 corresponding to the plurality of mobile communication identifiers from the plurality of cell sites 106 and stored in the database 124.

At block 316, the one or more applications apply a plurality of exclusions to the plurality of mobile communication devices based on the analysis. At block 318, the one or more applications generate a list of a subset of the plurality of mobile communication devices based on the plurality of exclusions. The subset of the plurality of mobile communication devices may consist of non-excluded mobile communication devices.

At block 320, the one or more applications select a plurality of control group mobile communication devices that did not receive the content. At block 322, the one or more applications determine a plurality of control group mobile communication device identifiers corresponding to the plurality of control group mobile communication devices. At block 324, the one or more applications analyze mobile communication device data 140 corresponding to the plurality of control group mobile communication devices from the plurality of cell sites 106 and stored in the database 124. At block 326, the one or more applications apply the plurality of exclusions to the plurality of control group mobile communication devices based on the analysis.

At block 328, the one or more applications generate a list of a subset of the plurality of control group mobile communication devices based on the plurality of exclusions. The subset of the plurality of control group mobile communication devices may consist of non-excluded control group mobile communication devices. At block 330, the one or more applications remove one or more of the non-excluded mobile communication devices from the list of the subset of the plurality of mobile communication devices based on the number of non-excluded control group mobile communication devices in the subset of the plurality of control group mobile communication devices.

Figure 4:
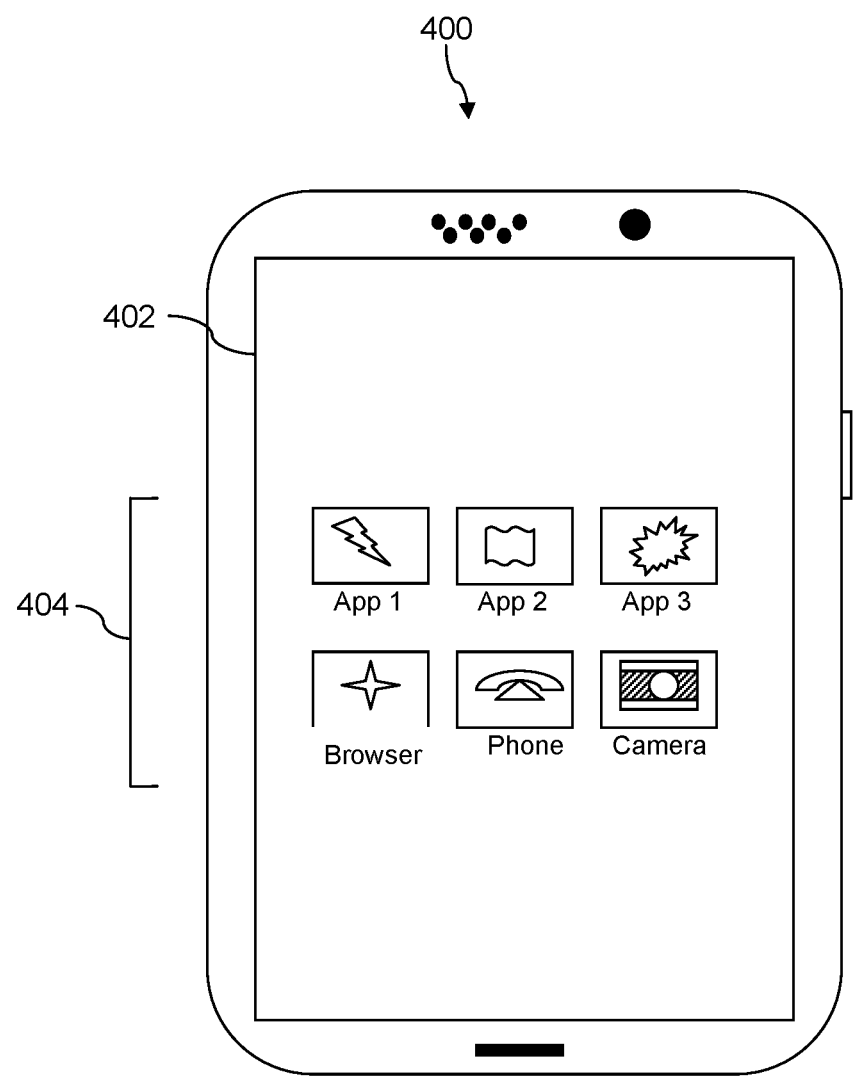
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
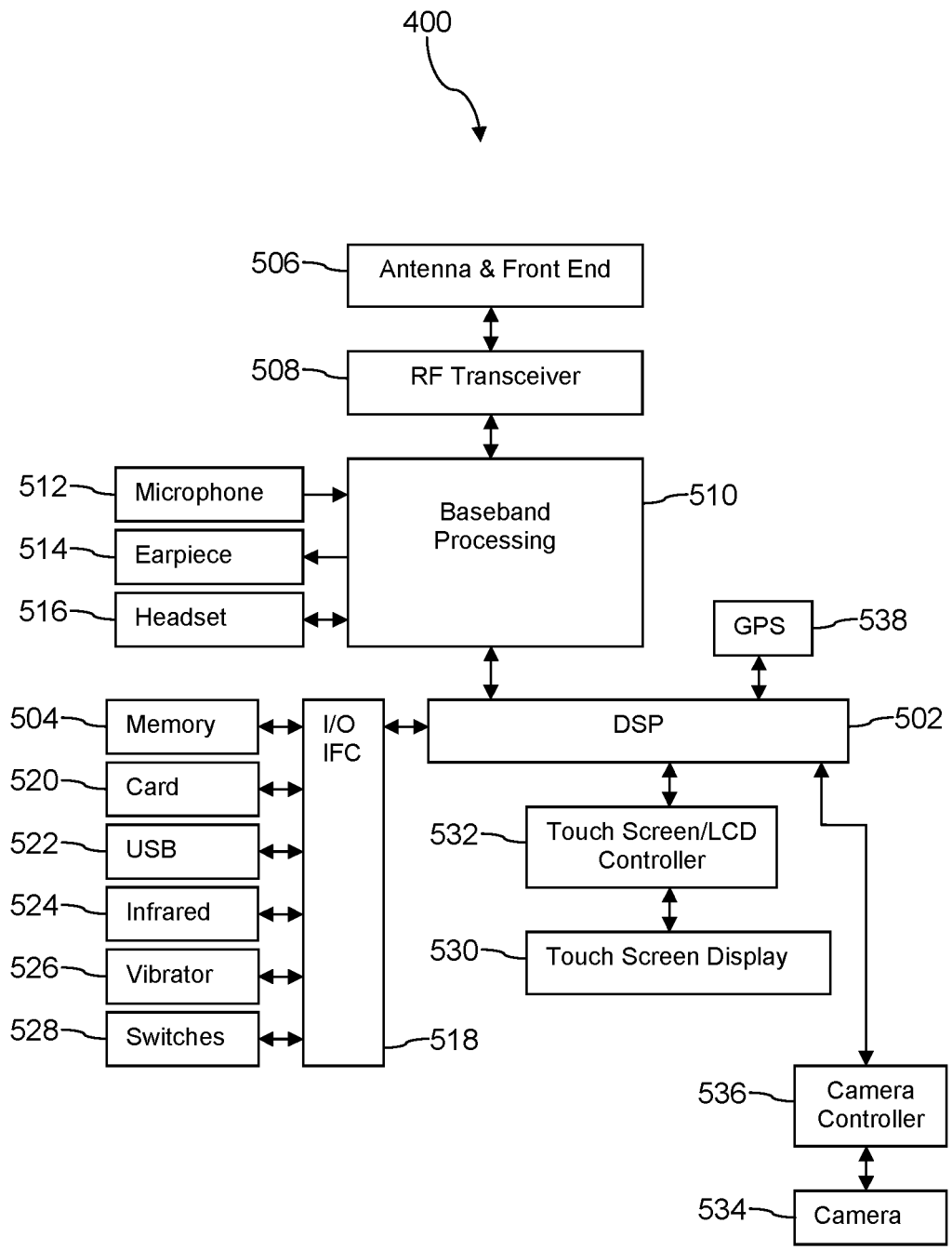
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
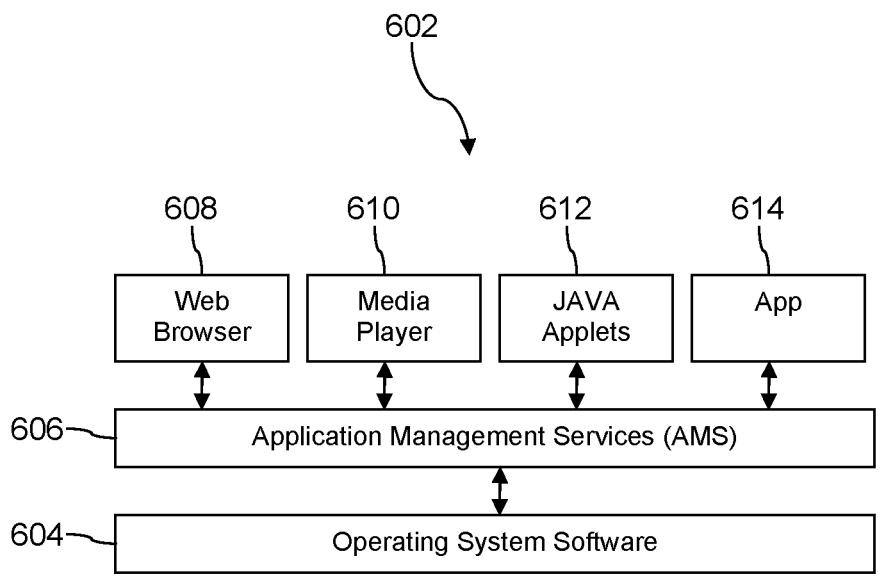
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

The third party application 614 may be dynamically downloaded and installed during a first time that the mobile communication device 400 enters a retail store (e.g., any of a plurality of retails stores associated with a particular enterprise) and may be activated on subsequent entries into a retail store. Alternatively, the third party application 614 may be installed in another way (e.g., the user elects to install the application 614, for example to obtain coupons or other desirable features provided via the application 614).

Figure 6B:
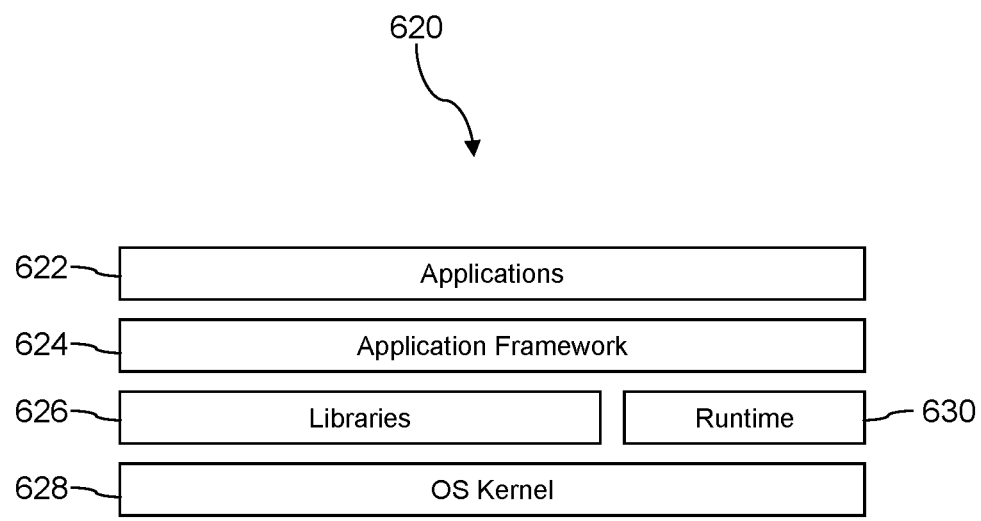
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
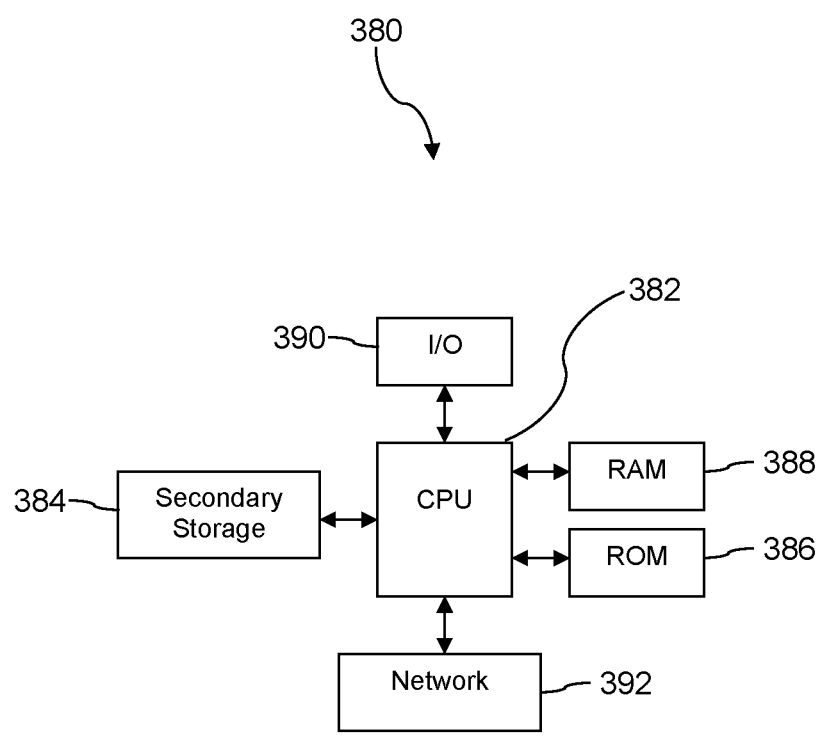
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for geographic, temporal, and location-based detection and analysis of mobile communication devices in a communication network, comprising:
    a database comprising cell site data that indicates a coverage area of each of a plurality of cell sites in a wireless network, mobile communication device data from the plurality of cell sites, and a look-up table associating identifiers with mobile communication device identifiers; and
    a server communicatively coupled to the database, comprising:
        a non-transitory memory,
        a processor, and
        one or more applications stored in the non-transitory memory, that when executed by the processor:
            receive location data from a vendor server associated with a vendor, wherein the location data comprises locations of a plurality of stores of the vendor,
            determine which cell sites of the plurality of cell sites have coverage areas that include the locations of the plurality of stores based on the received location data and the cell site data from the database,
            set a boundary around each of the locations of the plurality of stores,
            determine which one or more cell sectors associated with the determined cell sites are at least partially within each boundary based on the cell site data from the database,
            receive a plurality of messages comprising a plurality of identifiers from a plurality of mobile communication devices in response to display of content on the plurality of mobile communication devices, wherein the content is associated with the vendor and a time period,
            determine a plurality of mobile communication device identifiers corresponding to the plurality of identifiers using the look-up table in the database,
            analyze the mobile communication device data corresponding to the plurality of mobile communication identifiers from the database,
            determine which cell sectors each of the plurality of mobile communications devices resided within during the time period and dwell times for each mobile communication device within each of the cell sectors based on the analysis,
            exclude any mobile communication devices of the plurality of mobile communication devices within the boundary during the time period with dwell times less than a minimum dwell time threshold,
            exclude any mobile communication devices of the plurality of mobile communication devices within the boundary during the time period with dwell times greater than a maximum dwell time threshold,
            generate a list of a subset of the plurality of mobile communication devices based on the exclusions, wherein the subset of the plurality of mobile communication devices consists of non-excluded mobile communication devices, and
            display the list on a display.

2. The system of claim 1, further comprising:
    the plurality of mobile communication devices, each of the plurality of mobile communication devices comprising:
        a non-transitory memory,
        a processor, and
        an analysis application stored in the non-transitory memory, that when executed by the processor:
            determines that the content is displayed on a corresponding mobile communication device, and
            transmits a message comprising an identifier associated with the corresponding mobile communication device to the server.

3. The system of claim 1, wherein the one or more applications, when executed by the processor:
    validate whether a purchase was made at one or more of the plurality of stores within the time period by each of the non-excluded mobile communication devices by sending corresponding identifiers associated with the non-excluded mobile communication devices to a third-party server, receive a report from the third-party server, the report indicating each transaction with the vendor during the time period associated with any of the corresponding identifiers and a purchase amount of each transaction, and send the report to the vendor.

4. The system of claim 1, wherein the one or more applications, when executed by the processor:

exclude any mobile communication devices of the plurality of mobile communication devices not within the boundary during the time period, and exclude any mobile communication devices of the plurality of mobile communication devices within the boundary during non-operating hours of the vendor.

5. The system of claim 1, wherein the one or more applications, when executed by the processor:

determine a historical device pattern for each of the plurality of mobile communications devices by determining which cell sectors each of the plurality of mobile communications devices historically resided within before the time period and historical dwell times for each mobile communication device within each of the cell sectors before the time period based on the analysis, and exclude any mobile communication devices of the plurality of mobile communication devices that have historical device patterns within the boundary.

6. The system of claim 1, wherein the database comprises geographic feature data that indicates locations of a plurality of geographic features, and wherein the one or more applications, when executed by the processor:

determine one or more geographic features within the boundary based on the geographic feature data, determine a historical device pattern in relation to the one or more geographic features based on the mobile communication device data by determining typical dwell times at the one or more geographic features and at what times of day, and exclude any mobile communication devices of the plurality of mobile communication devices within the boundary during the time period with dwell times at times of day consistent with the historical device pattern in relation to the one or more geographic features.

7. The system of claim 1, wherein the minimum dwell time threshold and the maximum dwell time threshold are determined by the vendor based on a type of good or service provided by the vendor at the plurality of stores.

8. A method for geographic, temporal, and location-based detection and analysis of mobile communication devices in a communication network, each step of the method performed by one or more applications stored in a non-transitory memory of a server and executable by a processor of the server, the method comprising:

receiving location data from a vendor server associated with a vendor, wherein the location data comprises locations of a plurality of stores of the vendor;

determining which cell sites of a plurality of cell sites have coverage areas that include the locations of the plurality of stores based on the received location data and cell site data from a database, wherein the cell site data indicates a coverage area of each of the plurality of cell sites in a wireless network;

setting a boundary around each of the locations of the plurality of stores;

determining which one or more cell sectors associated with the determined cell sites are at least partially within each boundary based on the cell site data from the database;

receiving a plurality of messages comprising a plurality of identifiers from a plurality of mobile communication devices in response to display of content on the plurality of mobile communication devices, wherein the content is associated with the vendor and a time period;

determining a plurality of mobile communication device identifiers corresponding to the plurality of identifiers using a look-up table in the database, wherein the look-up table associates identifiers with mobile communication device identifiers;

analyzing mobile communication device data corresponding to the plurality of mobile communication identifiers from the plurality of cell sites and stored in the database;

determining a historical device pattern for each of the plurality of mobile communications devices by determining which cell sectors each of the plurality of mobile communications devices historically resided within before the time period and historical dwell times for each mobile communication device within each of the cell sectors before the time period based on the analysis;

excluding any mobile communication devices of the plurality of mobile communication devices that have historical device patterns within the boundary;

determining one or more geographic features within the boundary based on geographic feature data in the database;

determining a historical device pattern in relation to the one or more geographic features based on the mobile communication device data by determining typical dwell times at the one or more geographic features and at what times of day;

excluding any mobile communication devices of the plurality of mobile communication devices within the boundary during the time period with dwell times at times of day consistent with the historical device pattern in relation to the one or more geographic features;

generating a list of a subset of the plurality of mobile communication devices based on the exclusions, wherein the subset of the plurality of mobile communication devices consists of non-excluded mobile communication devices; and displaying the list on a display.

9. The method of claim 8, further comprising:

determining which cell sectors each of the plurality of mobile communications devices resided within during the time period and dwell times for each mobile communication device within each of the cell sectors based on the analysis;

excluding any mobile communication devices of the plurality of mobile communication devices not within the boundary during the time period;

excluding any mobile communication devices of the plurality of mobile communication devices within the boundary during the time period with dwell times less than a minimum dwell time threshold; and excluding any mobile communication devices of the plurality of mobile communication devices within the boundary during the time period with dwell times greater than a maximum dwell time threshold.

10. The method of claim 9, further comprising:
selecting a plurality of control group mobile communication devices that did not receive the content;
determining a plurality of control group mobile communication device identifiers corresponding to the plurality of control group mobile communication devices;
analyzing mobile communication device data corresponding to the plurality of control group mobile communication identifiers from the plurality of cell sites and stored in the database;
determining which cell sectors each of the plurality of control group mobile communications devices resided within during the time period and dwell times for each control group mobile communication device within each of the cell sectors based on the analysis;
determining a historical device pattern for each of the plurality of control group mobile communications devices by determining which cell sectors each of the plurality of control group mobile communications devices historically resided within before the time period and historical dwell times for each control group mobile communication device within each of the cell sectors before the time period based on the analysis;
excluding any mobile communication devices of the plurality of control group mobile communication devices not within the boundary during the time period;
excluding any mobile communication devices of the plurality of control group mobile communication devices within the boundary during the time period with dwell times less than the minimum dwell time threshold;
excluding any mobile communication devices of the plurality of control group mobile communication devices within the boundary during the time period with dwell times greater than the maximum dwell time threshold;
excluding any mobile communication devices of the plurality of control group mobile communication devices that have historical device patterns within the boundary;
excluding any mobile communication devices of the plurality of control group mobile communication devices within the boundary during the time period with dwell times at times of day consistent with the historical device pattern in relation to the one or more geographic features;
generating a list of a subset of the plurality of control group mobile communication devices based on the exclusions to the plurality of control group mobile communication devices, wherein the subset of the plurality of control group mobile communication devices consists of non-excluded control group mobile communication devices; and
removing one or more of the non-excluded mobile communication devices from the list of the subset of the plurality of mobile communication devices based on the number of non-excluded control group mobile communication devices in the subset of the plurality of control group mobile communication devices.

11. The method of claim 8, wherein the plurality of identifiers comprises a plurality of advertisement identifiers.

12. The method of claim 8, wherein the content comprises at least one advertisement.

13. The method of claim 8, wherein the plurality of mobile communication device identifiers comprises one or more of mobile equipment identifiers, international mobile subscriber identities, or international mobile equipment identities.

14. The method of claim 8, further comprising transmitting, by a content server, additional content to the non-excluded mobile communication devices based on the generated list of the subset of the plurality of mobile communication devices, wherein the content and the additional content are associated with different advertising campaigns.

15. A method for geographic, temporal, and location-based detection and analysis of mobile communication devices in a communication network each step of the method performed by one or more applications stored in a non-transitory memory of a server and executable by a processor of the server, the method comprising:
receiving location data from a vendor server associated with a vendor, wherein the location data comprises locations of a plurality of stores of the vendor;
determining which cell sites of a plurality of cell sites have coverage areas that include the locations of the plurality of stores based on the received location data and cell site data from a database, wherein the cell site data indicates a coverage area of each of the plurality of cell sites in a wireless network;
setting a boundary around each of the locations of the plurality of stores;
determining which one or more cell sectors associated with the determined cell sites are at least partially within each boundary based on the cell site data from the database;
receiving a plurality of messages comprising a plurality of identifiers from a plurality of mobile communication devices in response to display of content on the plurality of mobile communication devices, wherein the content is associated with the vendor and a time period;
determining a plurality of mobile communication device identifiers corresponding to the plurality of identifiers using a look-up table in the database, wherein the look-up table associates identifiers with mobile communication device identifiers;
analyzing mobile communication device data corresponding to the plurality of mobile communication identifiers from the plurality of cell sites and stored in the database;
applying a plurality of exclusions to the plurality of mobile communication devices based on the analysis;
generating a list of a subset of the plurality of mobile communication devices based on the plurality of exclusions, wherein the subset of the plurality of mobile communication devices consists of non-excluded mobile communication devices;
selecting a plurality of control group mobile communication devices that did not receive the content;
determining a plurality of control group mobile communication device identifiers corresponding to the plurality of control group mobile communication devices;
analyzing mobile communication device data corresponding to the plurality of control group mobile communication identifiers from the plurality of cell sites and stored in the database;
applying the plurality of exclusions to the plurality of control group mobile communication devices based on the analysis;
generating a list of a subset of the plurality of control group mobile communication devices based on the plurality of exclusions, wherein the subset of the plurality of control group mobile communication devices consists of non-excluded control group mobile communication devices; and removing one or more of the non-excluded mobile communication devices from the list of the subset of the plurality of mobile communication devices based on the number of non-excluded control group mobile communication devices in the subset of the plurality of control group mobile communication devices.

16. The method of claim 15, wherein the plurality of mobile communication devices that display the content are selected to receive the content based on a common demographic profile, and wherein the plurality of control group mobile communication devices are selected based on the common demographic profile.

17. The method of claim 15, wherein applying the plurality of exclusions to the plurality of mobile communication devices based on the analysis comprises:

determining which cell sectors each of the plurality of mobile communications devices resided within during the time period and dwell times for each mobile communication device within each of the cell sectors;

excluding any mobile communication devices of the plurality of mobile communication devices not within the boundary during the time period;

excluding any mobile communication devices of the plurality of mobile communication devices within the boundary during the time period with dwell times less than a minimum dwell time threshold;

excluding any mobile communication devices of the plurality of mobile communication devices within the boundary during the time period with dwell times greater than a maximum dwell time threshold;

determining a historical device pattern for each of the plurality of mobile communications devices by determining which cell sectors each of the plurality of mobile communications devices historically resided within before the time period and historical dwell times for each mobile communication device within each of the cell sectors before the time period;

excluding any mobile communication devices of the plurality of mobile communication devices that have historical device patterns within the boundary;

determining one or more geographic features within the boundary based on geographic feature data in the database;

determining a historical device pattern in relation to the one or more geographic features based on the mobile communication device data by determining typical dwell times at the one or more geographic features and at what times of day; and excluding any mobile communication devices of the plurality of mobile communication devices within the boundary during the time period with dwell times at times of day consistent with the historical device pattern in relation to the one or more geographic features.

18. The method of claim 15, wherein applying the plurality of exclusions to the plurality of control group mobile communication devices based on the analysis comprises:

determining which cell sectors each of the plurality of control group mobile communications devices resided within during the time period and dwell times for each control group mobile communication device within each of the cell sectors;

excluding any mobile communication devices of the plurality of control group mobile communication devices not within the boundary during the time period;

excluding any mobile communication devices of the plurality of control group mobile communication devices within the boundary during the time period with dwell times less than a minimum dwell time threshold;

excluding any mobile communication devices of the plurality of control group mobile communication devices within the boundary during the time period with dwell times greater than a maximum dwell time threshold;

determining a historical device pattern for each of the plurality of control group mobile communications devices by determining which cell sectors each of the plurality of control group mobile communications devices historically resided within before the time period and historical dwell times for each control group mobile communication device within each of the cell sectors before the time period;

excluding any mobile communication devices of the plurality of control group mobile communication devices that have historical device patterns within the boundary;

determining one or more geographic features within the boundary based on geographic feature data in the database;

determining a historical device pattern in relation to the one or more geographic features based on the mobile communication device data by determining typical dwell times at the one or more geographic features and at what times of day; and excluding any mobile communication devices of the plurality of control group mobile communication devices within the boundary during the time period with dwell times at times of day consistent with the historical device pattern in relation to the one or more geographic features.

19. The method of claim 15, further comprising:

for each of the plurality of mobile communication devices, determining, by an analysis application stored in a non-transitory memory of a corresponding mobile communication device and executed by a processor of the corresponding mobile communication device, that the content is displayed on a corresponding mobile communication device; and transmitting, by the analysis application, a message comprising an identifier associated with the corresponding mobile communication device to the server.

20. The method of claim 15, further comprising:

validating whether a purchase was made at one or more of the plurality of stores within the time period by each of the non-excluded mobile communication devices by sending corresponding identifiers associated with the non-excluded mobile communication devices to a third-party server;

receiving a report from the third-party server, the report indicating each transaction with the vendor during the time period associated with any of the corresponding identifiers and a purchase amount of each transaction; and sending the report to the vendor.

* * * * *